(12) United States Patent
Yang et al.

(10) Patent No.: US 8,042,069 B2
(45) Date of Patent: Oct. 18, 2011

(54) METHOD FOR SELECTIVELY AMENDING LAYOUT PATTERNS

(75) Inventors: Yu-Shiang Yang, Tainan County (TW); Te-Hung Wu, Tainan County (TW); Yung-Feng Cheng, Kaohsiung County (TW); Chuen Huei Yang, Taipei (TW); Hsiang-Yun Huang, Kaohsiung (TW); Hui-Fang Kuo, Kaohsiung (TW); Shih-Ming Kuo, Tainan County (TW); Lun-Hung Chen, Kaohsiung (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 507 days.

(21) Appl. No.: 12/188,192

(22) Filed: Aug. 7, 2008

(65) Prior Publication Data
US 2010/0036644 A1   Feb. 11, 2010

(51) Int. Cl.
*G06F 17/50*   (2006.01)
(52) U.S. Cl. ............................. 716/55; 716/53; 716/54
(58) Field of Classification Search ................... 716/54, 716/55, 53
See application file for complete search history.

(56) References Cited

U.S. PATENT DOCUMENTS

| | | | |
|---|---|---|---|
| 6,282,696 B1 | 8/2001 | Garza | |
| 6,539,521 B1 | 3/2003 | Pierrat | |
| 2003/0097647 A1* | 5/2003 | Pierrat et al. | 716/19 |
| 2005/0044513 A1* | 2/2005 | Robles et al. | 716/4 |
| 2005/0204328 A1 | 9/2005 | Strelkova | |
| 2005/0229130 A1* | 10/2005 | Wu et al. | 716/8 |
| 2006/0085772 A1* | 4/2006 | Zhang | 716/4 |
| 2008/0005704 A1* | 1/2008 | Miloslavsky et al. | 716/2 |
| 2008/0301611 A1* | 12/2008 | Word et al. | 716/9 |
| 2009/0064085 A1* | 3/2009 | Bang | 716/21 |
| 2009/0241077 A1* | 9/2009 | Lippincott et al. | 716/5 |
| 2010/0005434 A1* | 1/2010 | Wang | 716/5 |
| 2010/0131909 A1* | 5/2010 | Miloslavsky et al. | 716/5 |
| 2010/0153904 A1* | 6/2010 | Zhang | 716/21 |

FOREIGN PATENT DOCUMENTS

| | | |
|---|---|---|
| JP | 2001350250 A | 12/2001 |
| JP | 2009020393 | 1/2009 |
| TW | I230877 | 4/2005 |

\* cited by examiner

*Primary Examiner* — Suresh Memula (74) *Attorney, Agent, or Firm* — Winston Hsu; Scott Margo (57) ABSTRACT

A method to selectively amend a layout pattern is disclosed. First, a layout pattern including at least a first group and a second group is provided, wherein each one of the first group and the second group respectively includes multiple members. Second, a simulation procedure and an amendment procedure are respectively performed on all the members of the first group and the second group to obtain an amended first group and an amended second group. Then, the amended first group and the amended second group are verified as being on target or not. Afterwards, the layout pattern including the on target amended first group and the on target amended second group is output.

36 Claims, 6 Drawing Sheets

METHOD FOR SELECTIVELY AMENDING LAYOUT PATTERNS

BACKGROUND OF THE INVENTION

1. Field of the Invention

The present invention relates to a method for amending layout patterns. More particularly, the present invention relates to a method for selectively amending layout patterns.

2. Description of the Prior Art

Critical technologies such as the photolithography and etching technologies are frequently used in semiconductor manufacturing processes. The photolithography technology usually involves transferring a complicated integrated circuit pattern to a semiconductor wafer surface for steps such as etching and implantation. These patterns must be extremely accurate for forming delicate integrated circuits so as to align with the patterns of the previous and following steps.

In the photolithographic step, deviations often occur and jeopardize the performance of the semiconductor device when the patterns on the reticles are transferred onto the wafer surface. Such deviations are usually related with the characters of the patterns to be transferred, the topology of the wafer, the source of the light and various process parameters.

There are many known verification methods, correction methods and compensation methods for the deviations caused by the optical proximity effect, process rules (PRC) and lithography rules (LRC) to improve the image quality after transfer. Some of the known methods are called optical proximity correction (OPC), process rule check (PRC) and lithography rule check (LRC). The commercially available OPC software may test problems such as pitch, bridge, and critical dimension uniformity in the layout patterns. Such software may correct the standard layout patterns on the reticles using the theoretical image, so as to obtain correctly exposed image patterns on the wafers. Such methods not only test problems in the layout patterns but also correct the layout patterns on the reticles using the theoretical image. If the corrected image patterns are useable, they are output for the fabrication of reticles to obtain the correct image patterns on the wafer.

Generally speaking, there are well-established stand operational procedures available for the reference of the above-mentioned verification, correction and compensation methods. For example, the conventional procedure using optical proximity correction to verify the layout patterns on a reticle may be first inputting a layout pattern. Then the Boolean pre-treatment of OPC is performed on the layout pattern to obtain a preliminary layout pattern. Afterwards the OPC is performed to correct any particular pattern. Later, the process rule check (PRC) and the lithography rule check (LRC) are separately performed. Then the error screening and check is performed. If the obtained patterns are correct and usable, the patterns are output. If incorrect, the pattern correction is performed again and the patterns are output if no error is found.

Accordingly, it is an essential operational procedure in the manufacturing process of semiconductors to use the optical proximity correction model to correct the layout patterns to obtain useable layout patterns and to make the transfer of such layout patterns more precise.

SUMMARY OF THE INVENTION

It is one of the objects of the present invention to provide a method to selectively amend a layout pattern. In the method of the present invention, a layout pattern including at least a first group and a second group is provided. Each one of the first group and the second group respectively includes multiple members. Then, a simulation procedure and an amendment procedure are respectively performed on all the members of the first group and the second group so that all the members in the first group and in the second group are finally respectively on target. Such selective amendment of layout pattern which discriminatingly performs the simulation procedure and the amendment procedure on the first group and on the second group may boost the accuracy and the speed of the traditional optical proximity correction method in order to obtain useable layout patterns.

In the method to selectively amend a layout pattern of the present invention, first a layout pattern including at least a first group and a second group is provided, wherein each one of the first group and the second group respectively includes multiple members. Second, a simulation procedure and a first group amendment procedure are respectively performed on all the members of the first group to obtain an amended first group. Afterwards, a simulation procedure and a second amendment procedure are respectively performed on all the members of the second group to obtain an amended second group. Then, the amended first group and the amended second group are repeatedly verified till they are both on target. Afterwards, a second layout pattern including the on target amended first group and the on target amended second group is output. Optionally, the first group and the second group may be verified in advance to know if they are both on target or not. Or, a priority selection procedure may be performed on the first group and the second group which are both not on target to obtain a prior group and an inferior group.

Because in the method of the present invention, multiple different groups are classified into a first group and a second group before the actual amendment procedure, or a priority selection procedure is performed, the independent simulation procedure and the independent amendment procedure may discriminatingly be performed on all the members of the first group and the second group/prior group and inferior group when the simulation procedure and the amendment procedure are respectively performed on all the members of the first group and the second group. In such way, all the members in the first group and in the second group of different attributions can receive a more suitable simulation procedure as well as an amendment procedure so that all the members in the first group and in the second group are respectively on target as soon as possible. Such selective amendment of layout pattern may boost the accuracy and the speed of the traditional optical proximity correction method in order to obtain useable layout patterns.

These and other objectives of the present invention will no doubt become obvious to those of ordinary skill in the art after reading the following detailed description of the preferred embodiment that is illustrated in the various figures and drawings.

DETAILED DESCRIPTION

The present invention relates to a method for selectively amending layout patterns. Before the actual amendment procedure, multiple different groups are classified into a first group and a second group, or optionally a priority selection procedure is primarily performed. An independent simulation procedure and an independent amendment procedure may later discriminatingly and respectively be performed on all the members of the first group and the second group. In the method of the present invention, the priority selection procedure sorts the prior group from the inferior group in the collection of multiple different groups so that all the members in the prior group and in the inferior group are respectively to be on target as soon as possible. Such selective amendment of layout pattern may boost the accuracy and the speed of the traditional optical proximity correction method to obtain useable layout patterns.

Figure 1:
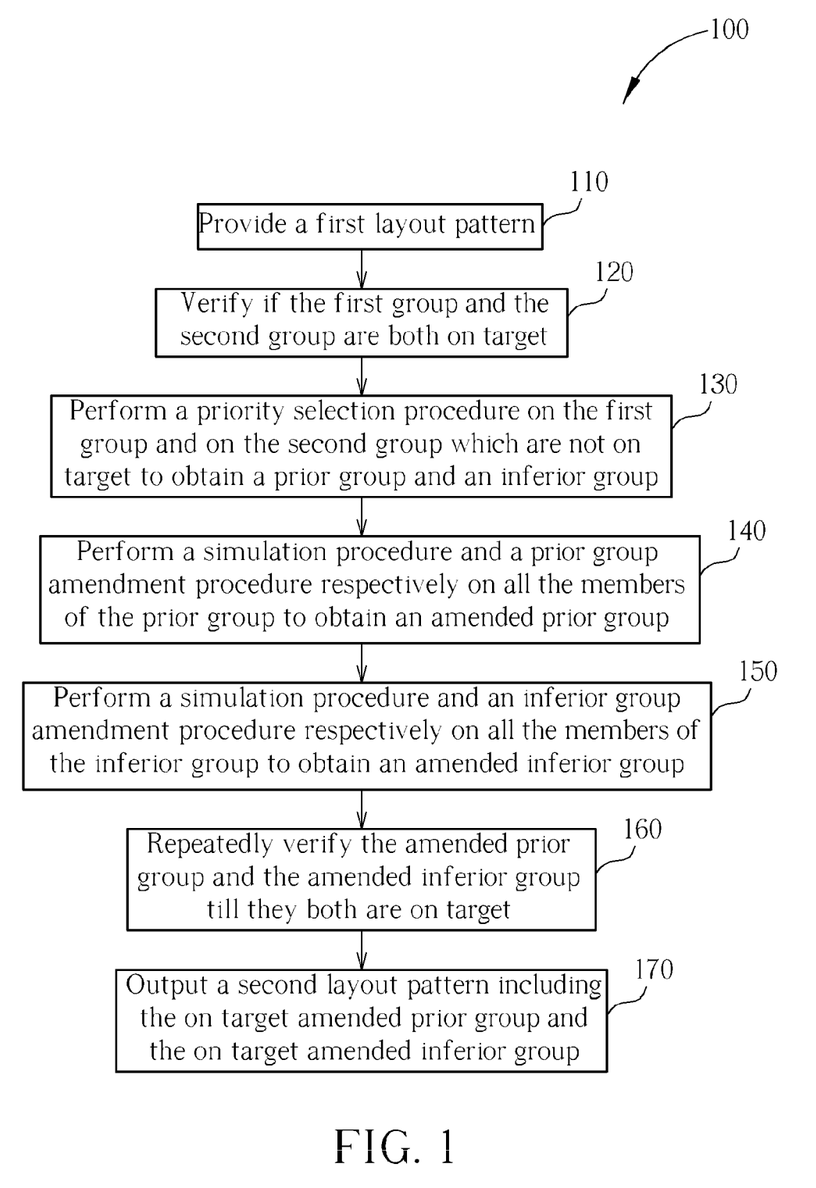
FIG. 1 illustrates a flow chart of the main flow of the method to selectively amend a layout pattern of the present invention.

FIG. 1 illustrates a flow chart of the main flow of the method to selectively amend a layout pattern of the present invention. The method 100 to selectively amend a layout pattern of the present invention includes:

Step 110: provide a first layout pattern;

Step 120: optionally verify if the first group and the second group are both on target;

Step 130: optionally perform a priority selection procedure on the first group and on the second group which are not on target to obtain a first group and a second group;

Step 140: perform a simulation procedure and a first group amendment procedure respectively on all the members of the first group to obtain an amended first group;

Step 150: perform a simulation procedure and a second group amendment procedure respectively on all the members of the second group to obtain an amended second group;

Step 160: repeatedly verify the amended first group and the amended second group till they both are on target; and Step 170: output a second layout pattern including the on target amended first group and the on target amended second group.

First, in step 110 the first layout pattern may be a pattern that needs transferring, for example, a layout pattern such as contact hole patterns, via hole patterns, doped regions, polysilicon gates, of the static random access memory (SRAM). Alternatively, the first layout pattern may be a preliminary layout pattern after a traditional optical proximity correction. This first layout pattern may include at least a first group and a second group of different attributions. In addition, the first group and the second group may respectively include multiple members.

The following is a preferred embodiment of illustrating the relationship between the groups and the members in a given layout pattern. Please refer to FIG. 2, which illustrates a given layout pattern including multiple groups and their members. For example, a layout pattern may include multiple templates 210/211. Each template 210, 211 is composed of multiple shapes 220, 221, 222, 223, 224, 225, 226. Each shape 220, 221, 222, 223, 224, 225, 226 includes at least one edge. For instance, the shape 221 includes at least the representative edge 231, 232, 233, 234. Preferably, different edges 231, 232, 233, 234 may be normal to each other, or have an angle of 135° between each other. Under the operation of the optical proximity correction model, each edge may be optionally divided into multiple segments such as 241, 242, 243, 244. Each segment 241, 242, 243, 244 is regarded as the smallest operational unit under the operation of the selective optical proximity correction model of the present invention.

Figure 3:
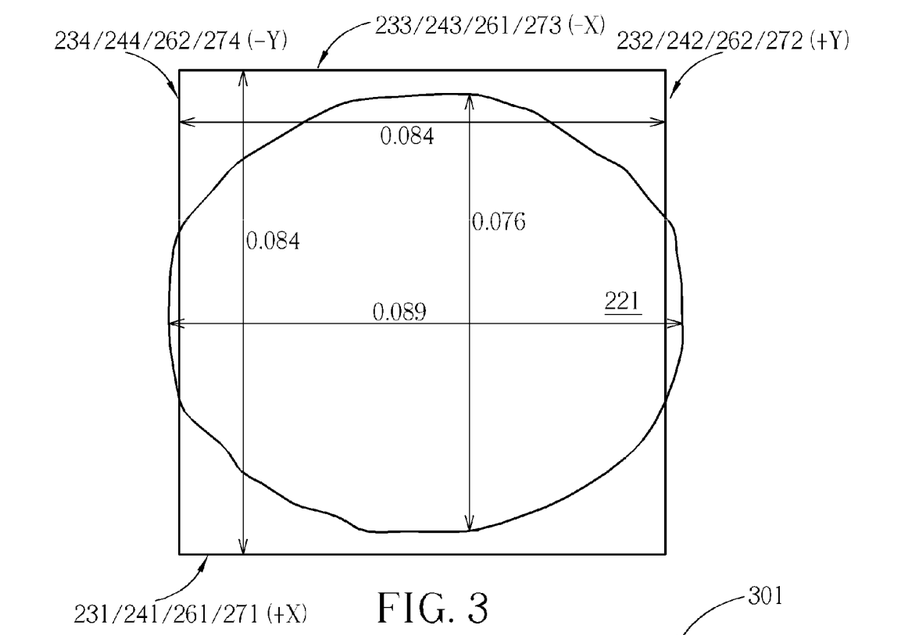
FIG. 3 illustrates a round pattern, an expected contact hole pattern for example.

As shown in FIG. 3, different edges 231, 232 which are normal to each other may be regarded as groups of different attributions. On the other hand, different edges 231, 232 which are parallel to each other may be regarded as groups of the same attribution. Accordingly, different edges 231, 232 are deemed to be in the different groups, i.e. the first group 261 and the second group 262. Therefore, the segments 241, 243 belonging to the edge 231, 233 may be considered as the members 271, 273. The segments 242, 244 belonging to the edge 232, 234 may be considered as the members 272, 274.

Figure 2:
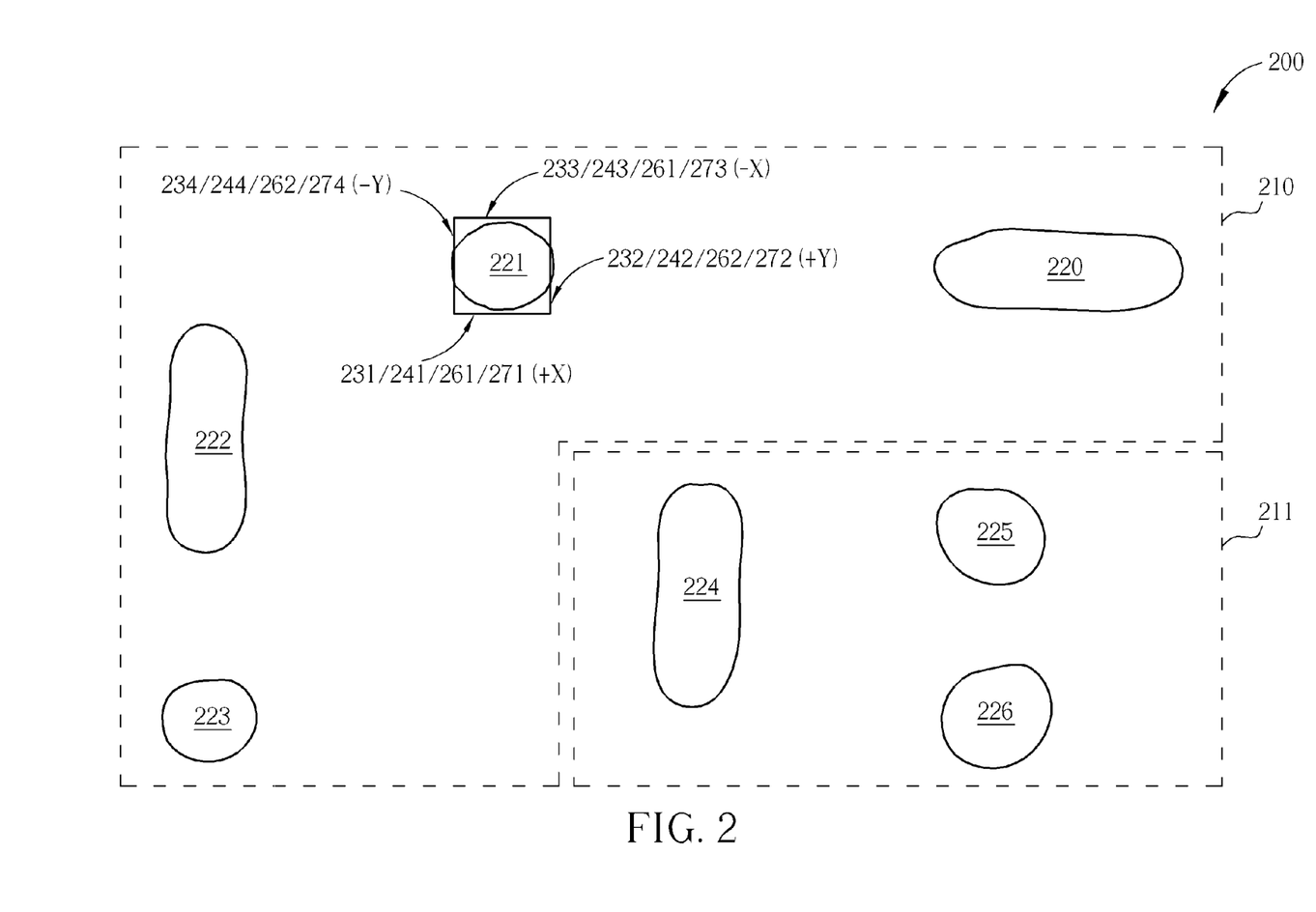
FIG. 2, which illustrates a given layout pattern including multiple groups and their members.

In other words, the first layout pattern 200 includes the first group 261 and the second group 262. The first group 261 includes its members 271, 273. The second group 262 includes its members 272, 274. On the other hand, in the layout pattern 200 any edge which is parallel with one of the edges 231, 232 is classified in the same group.

Figure 4:
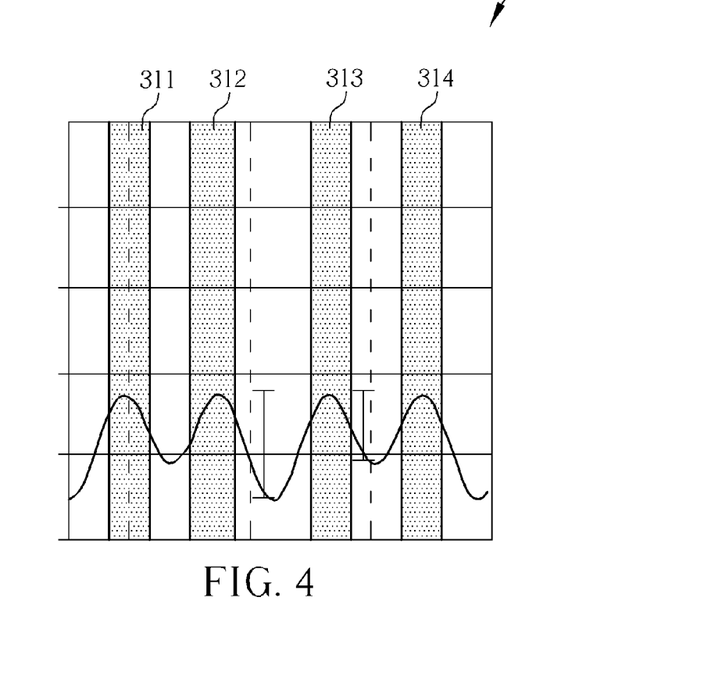
FIG. 4 illustrates an exposure intensity of multiple shapes in a layout pattern.

During the lithographic step that the patterns on the reticles are transferred onto the surface of the wafers, deviations occur due to the process parameters such as the sources of the light or the characters of the patterns. For example, when an asymmetric light source such as QUASAR illumination is used to transfer the standard patterns on the reticle to the surface of the wafers, each different edge 232/231 which is normal to each other in the same shape readily reacts differently to the same QUASAR illumination and yields different sensitivities and results, such as different exposure intensities, namely a first exposure intensity and a second exposure intensity for example, or different contrasts, namely a first contrast and a second contrast for example. In the meantime, one of which should be more sensitive to the illumination and the other should be less sensitive, i.e. more insensitive or more insusceptible, namely more indifferent to the illumination, as shown in FIG. 4. Hence, the simulation procedure and the amendment procedure may independently and differently be performed on the edge 312/313 of different sensitive attributions to distinguish different simulation criteria and amendment criteria. For example, the sensitive group may yield an obvious result by means of a little amendment. On the other hand, however, the indifferent group may require greater amendment to yield a similar result.

Second, in step 120, the method of the present invention in the first place optionally verifies if the first group 261 and the second group 262 in the first layout pattern 200 are both on target. The concept "on target" may be different according to different optical proximity correction criteria. For example, the concept "on target" may be the group within an acceptable range of a critical dimension error. The idea of the critical dimension error is shown in FIG. 3. FIG. 3 illustrates a round pattern, an expected contact hole pattern for example. The contact hole pattern is expected to have a uniform dimension of 84 nm*84 nm. However, after the simulation of the optical proximity correction, it is evaluated to have a dimension of 89 nm*76 nm. Because the absolute value of the longer side=|76-84|=8>the absolute value of the shorter side=|89-84|=5, the greater value 8 nm is therefore used to determine if the group is within an acceptable range of a critical dimension error.

Moreover, other parameters may be used to verify if the first group and the second group in the first layout pattern are on target or not. FIG. 4 illustrates the exposure intensity of multiple shapes in a layout pattern. The layout pattern 301 has multiple shapes 311, 312, 313 and 314. Let contrast intensity=(intensity$_{max}$−intensity$_{min}$)/(intensity$_{max}$+intensity$_{min}$)

For example, there is a first contrast intensity 0.5476 between the shape 312 and 313, and there is a second contrast intensity 0.3122 between the shape 313 and 314. In this case, the concept "on target" may be a parameter of both values, i.e. the difference of the two intensities within a specific range, $1*10^{-4}$ for example. It is unequivocal that the first contrast intensity and the second contrast intensity fail to be within the specific range because the difference is 0.2354.

If the first group and the second group in the first layout pattern happen to be both on target, the first layout pattern may be directly output because all members in the first group and in the second group in the first layout pattern meet the expected demands.

However, in most cases, not both the first group and the second group in the first layout pattern are on target. Now, optionally the method of the present invention goes to the step 130: perform a priority selection procedure on the first group and on the second group which are both not on target to obtain a prior group and an inferior group.

Please note that until now the sensitivity attributions of the first group and the second group are still unknown, so a priority selection procedure will be preliminarily performed on the first group and the second group so that the first group and the second group will be sorted into a prior group and an inferior group.

As described earlier, when the QUASAR illumination is used to transfer the standard patterns on the reticle to the surface of the wafers, the sensitivity of the edge 232/231 to the QUASAR illumination may be the criteria to perform the priority selection procedure. In accordance with the differences of the position of the edges 231, 232 relative to the QUASAR illumination, one of which is determined to be "sensitive" and the other is determined to be "indifferent," and optionally the sensitive one and the indifferent one are sorted to be the prior group and the inferior group.

For example, in the illustration of FIG. 4, because the first contrast intensity 0.5476 is greater than the second contrast intensity 0.3122, the first contrast intensity 0.5476 is determined to belong to the prior group, and the second contrast intensity 0.3122 is determined to belong to the inferior group.

After the prior group and the inferior group are determined, the method goes to the step 140: perform a simulation procedure and a prior group amendment procedure respectively on all the members of the prior group to obtain an amended prior group. Because the prior group has been through the priority selection procedure, all the members in the prior group must have the same specific attribute. Therefore, when the simulation procedure prior to the amendment procedure is performed on all the members in the prior group, a more consistent simulation result should be reached under a similar condition.

If the step 120/130 not performed, the method goes to the step 140: perform a simulation procedure and a first group amendment procedure respectively on all the members of the first group to obtain an amended first group. Because the first group has been through the priority selection procedure, all the members in the first group must have the same specific attribute. Therefore, when the simulation procedure prior to the amendment procedure is performed on all the members in the first group, a more consistent simulation result should be reached under a similar condition.

For example, as shown in FIG. 2, different edges 232/231 are normal to each other. Suppose the edge 231 is determined to be "sensitive" and the edge 232 is determined to be "indifferent" after the priority selection procedure, the sensitive one, i.e. the edge 231 is sorted to be the prior group and the indifferent one i.e. the edge 232 is sorted to be the inferior group according to the earlier described "sorting principle." The simulation procedure and the prior group amendment procedure are respectively performed on "all" the members 271, 273 in the first group 261, i.e. the edge 231. Generally speaking, the simulation procedure is first performed then the prior group amendment procedure is performed.

In the simulation procedure, an "adjusted direction" and a "correction weight" of each member, i.e. member 271, 273, are simulated. On one hand, the "adjusted direction" may be either outward or inward, which is determined by the "ambit" of such member. The outward adjustment is a matter of increasing the area and the inward adjustment is a matter of decreasing the area. Please refer to FIG. 5 for the adjusted direction of the member 271 in the shape 221. For example, for the member 271 only two directions, +Y and −Y to say, are possible. So the +Y direction corresponds to the outward adjustment and the −Y direction corresponds to the inward adjustment because the +Y movement makes the area of the shape 221 larger and the −Y movement makes the area of the shape 221 smaller.

On the other hand, when the adjusted direction of each member is determined, the method goes to the next stage to evaluate the "correction weight" of each member. The "correction weight" is the quantity of the movement with respect to the determined adjusted direction. The quantity of the movement involves the degree of change of the members in every shape and the degree of change of the outline of the amended geometry shapes. Please note that the more sensitive group may yield an obvious change of the geometry outline by means of a little amendment. On the other hand, however, the indifferent group may require greater amendment to yield a similar change of the geometry outline. Now suppose the "correction weight" of the member 271 in the shape 221 in FIG. 5 after the simulation is "A."

After the "adjusted direction" and the "correction weight" of each member are determined, the method goes to the next stage to perform the prior group amendment procedure. In the prior group amendment procedure, the actual "adjusted direction" and the "correction scale" of each member are determined in accordance with the "adjusted direction" and the "correction weight" of each member proposed by the simulation.

Figure 5:
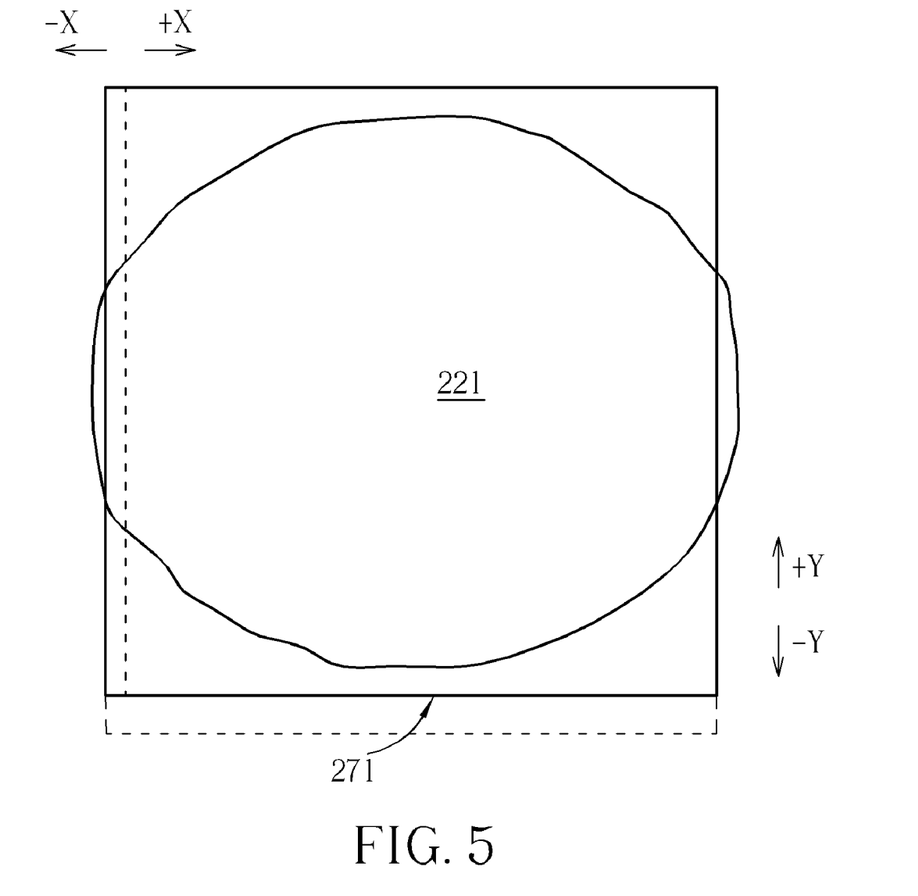
FIG. 5 illustrates the adjusted direction of a given member in a shape.

In spite of the "adjusted direction" and the "correction weight" of each member proposed by the simulation, optionally the "correction weight" of each member would not necessarily be identical to the "correction scale." In this invention, the "correction scale" may be the "correction weight" at a discount, which is called the "damping" of the correction weight. For example, the damping value may be 0 to 1 of the correction weight, such as 90%, 70%, 50%, 30% of the correction weight, based on different patterns and different optical proximity correction models. For instance, the "correction scale" of the member 271 in the shape 221 in FIG. 5 is "70% A."

The amended prior group is obtained after the prior group amendment procedure, and the original outline of the first layout pattern is changed accordingly. Usually, only the members in the prior group are amended in the prior group amendment procedure, preferably any members in the inferior group not involved, to avoid the interference of different groups.

After the simulation procedure and the prior group amendment procedure on all the members of the prior group are completed and the amended prior group is obtained, the method then goes to step 150: perform a simulation procedure and an inferior group amendment procedure respectively on all the members of the inferior group to obtain an amended inferior group. Because the inferior group has been through the priority selection procedure too, all the members in the inferior group must have the same specific attribute as well. Therefore, when the simulation procedure prior to the amendment procedure is performed on all the members in the inferior group, a more consistent simulation result should be reached under a similar condition.

If the step 120/130 not performed, the method then goes to step 150: perform a simulation procedure and a second group amendment procedure respectively on all the members of the second group to obtain an amended second group. Because the second group has been through the priority selection procedure too, all the members in the second group must have the same specific attribute as well. Therefore, when the simulation procedure prior to the amendment procedure is performed on all the members in the second group, a more consistent simulation result should be reached under a similar condition.

For example, as shown in FIG. 2, different edges 231, 232 are normal to each other. Suppose the edge 230 is determined to be "sensitive" and the edge 231 is determined to be "indifferent" after the priority selection procedure, the sensitive one, i.e. the edge 231 is sorted to be the prior group and the indifferent one i.e. the edge 232 is sorted to be the inferior group according to the earlier described "sorting principle." The simulation procedure and the inferior group amendment procedure are respectively performed on "all" the members 272, 274 in the second group 262, i.e. the inferior group (the edge 232). Generally speaking, the simulation procedure is first performed then the prior group amendment procedure is performed. Alternatively, such as the simple shapes illustrated in FIG. 3, each side is a single member. The simulation procedure and the amendment procedure may be first performed on either one of the first group 261 and the second group 262. Preferably, a priority selection procedure is performed to obtain a prior group and to perform the corresponding simulation procedure and the amendment procedure, then the corresponding simulation procedure and the amendment procedure is performed on the inferior group.

In the simulation procedure, an "adjusted direction" and a "correction weight" of each member, i.e. member 272, 274 are simulated. Please refer to FIG. 5 for the illustration of the detailed operation of the adjustment of the direction.

On the other hand, when the adjusted direction of each member is determined, the method goes to the next stage to evaluate the "correction weight" of each member. In this invention, please refer to FIG. 5 for the illustration, the "correction scale" may be the "correction weight" at a discount, which is called the damping of the correction weight. For example, the damping value may be 0 to 1 of the correction weight, such as 90%, 70%, 50%, 30% of the correction weight, based on different patterns and different optical proximity correction models.

The amended inferior group is obtained after the inferior group amendment procedure, and the original outline of the first layout pattern is changed again accordingly after the amended prior group. Usually, only the members in the inferior group are amended in the inferior group amendment procedure, preferably any members in the prior group not involved, to avoid the interference of different groups.

When the step 120/130 performed, after all the members in the prior group and in the inferior group going through the simulation procedure and the amendment procedure and the amended prior group and the amended inferior group are obtained, the amended prior group and the amended inferior group in the first layout pattern will be again verified to know if they are on target or not, which means the method goes to step 160: repeatedly verify the amended prior group and the amended inferior group till they both are on target. If the amended prior group and the amended inferior group in the first layout pattern happen to be both on target, the amended first layout pattern may be directly output because all members in the prior group and in the inferior group in the amended first layout pattern meet the expected demands.

When the step 120/130 not performed, after all the members in the first group and in the second group going through the simulation procedure and the amendment procedure and the amended first group and the amended second group are obtained, the amended first group and the amended second group in the first layout pattern will be again verified to know if they are on target or not, which means the method goes to step 160: repeatedly verify the amended first group and the amended second group till they both are on target. If the amended first group and the amended second group in the first layout pattern happen to be both on target, the amended first layout pattern may be directly output because all members in the first group and in the second group in the amended first layout pattern meet the expected demands.

Figure 6A:
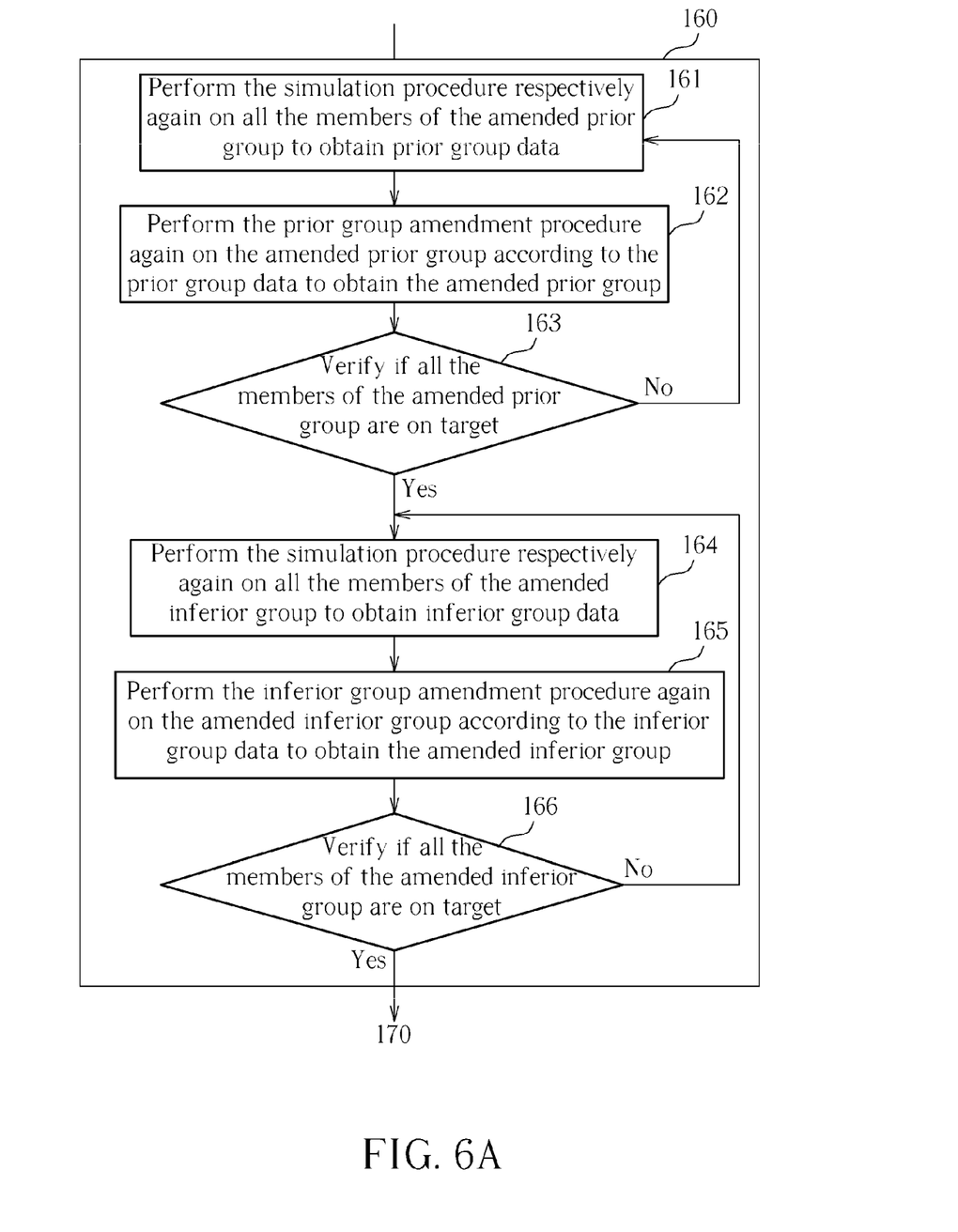
FIGS. 6A/6B further illustrates step 160.

However, in most cases, not both the first group and the second group in the amended first layout pattern are on target in spite of the amended first group and the amended second group being obtained after the first group and the second group in the first layout pattern went through one single simulation procedure and one single amendment procedure. Hence, step 160 may further include the following steps as shown in FIG. 6A:

Step 161: perform the simulation procedure respectively again on all the members of the amended first group to obtain first group data;

Step 162: perform the first group amendment procedure again on the amended first group according to the first group data to obtain the amended first group;

Step 163: verify if all the members of the amended first group are on target;

Step 164: perform the simulation procedure respectively again on all the members of the amended second group to obtain second group data;

Step 165: perform the second group amendment procedure again on the amended second group according to the second group data to obtain the amended second group; and Step 166: verify if all the members of the amended second group are on target.

In other words, in the sub-step 161/164, the simulation procedure is perform again respectively on all the members of the amended first group as well as all the members of the amended second group, preferably the simulation procedure independently performed respectively on all the members of the amended first group as well as all the members of the amended second group, to obtain the corresponding data. Then, in the sub-step 162/165, the first group amendment procedure as well as the second group amendment procedure are performed in turn based on such data, preferably first group amendment procedure as well as the second group amendment procedure independently performed, till the sub-step 163/166, all the members in the amended first group and the amended second group are on target.

Figure 6B:
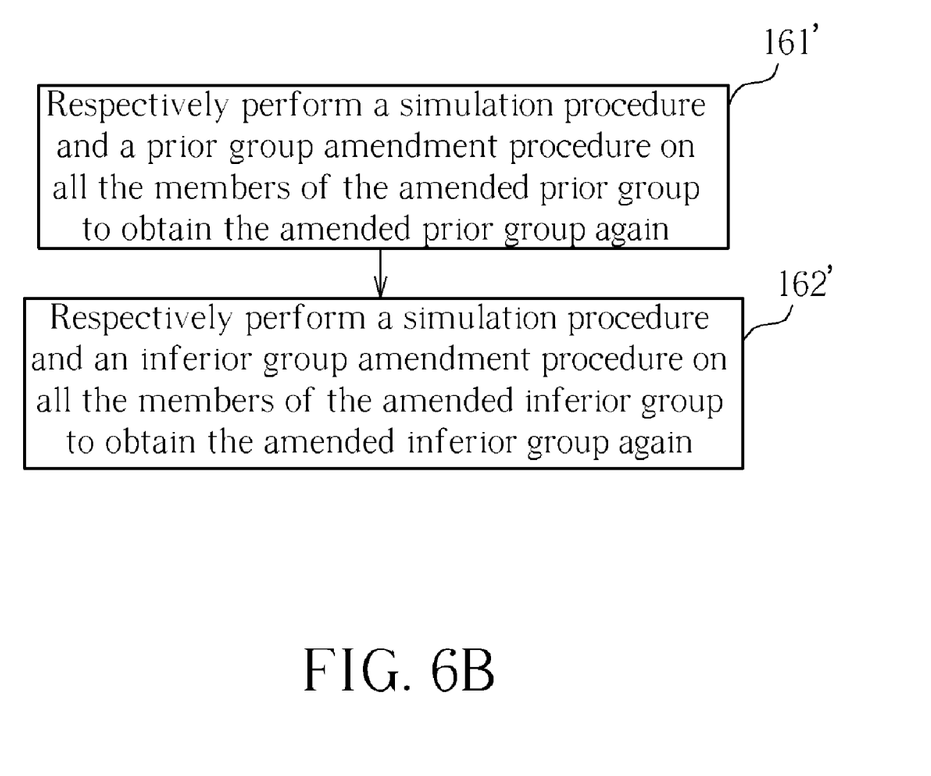

If the procedures of the first group and the second group are performed independently, the step 160 may be regarded as to further include the following steps as shown in FIG. 6B:

Step 161': respectively perform a simulation procedure and a first group amendment procedure on all the members of the amended first group to obtain the amended first group again.

Step 162': respectively perform a simulation procedure and a second group amendment procedure on all the members of the amended second group to obtain the amended second group again.

That is to say, the step 160 may usually be repeated more than once, till both the amended first group and the amended second group are on target. For instance, taking the shape exposure intensity of the layout pattern illustrated in FIG. 4 as an example, after several amendments of the step 160, the first contrast intensity between the shape 312 and 313 turns out to be 0.42917, and the second contrast intensity 0.3122 between the shape 313 and 314 turns out to be 0.42911. Obviously the first contrast intensity and the second contrast intensity are considered to be on target since the difference of the first contrast intensity and the second contrast intensity is $6*10^{-5}$, within a specific range, $1*10^{-4}$ for example.

Optionally the sub-step 161' and 162' may be repeated as many times as needed till all the first group and the second group are both on target. So the simulation procedure and the amendment procedure with respect to the first group and the second group may be performed many times to finally make the amended first group and the amended second group on target, which is called a useable second amended pattern. Thus, the original first layout pattern now becomes the useable second layout pattern. Consequently, the method goes to the step 170: output a second layout pattern including the on target amended first group and the on target amended second group. As a result, the required, useable layout pattern is finally obtained.

Those skilled in the art will readily observe that numerous modifications and alterations of the device and method may be made while retaining the teachings of the invention.

What is claimed is:

1. A method to selectively amend a layout pattern, comprising:
    providing a first layout pattern comprising at least a first group and a second group, wherein each of said first group and said second group respectively comprises multiple members;
    respectively performing a simulation procedure and a first group amendment procedure on said members of said first group to obtain an amended first group wherein said simulation procedure evaluates a correction direction and a correction weight, and said first group amendment procedure determines a damping of said correction weight;
    respectively performing said simulation procedure and a second group amendment procedure on said members of said second group to obtain an amended second group;
    verifying said amended first group and said amended second group till said amended first group and said amended second group are both on target; and
    outputting a second layout pattern comprising said amended first group and said amended second group which are both on target.

2. The method of claim 1, wherein said first group and said second group respectively is a first edge and a second edge of at least one geometric figure.

3. The method of claim 2, wherein said first edge is normal to said second edge.

4. The method of claim 1, wherein said first group and said second group respectively have a first contrast intensity and a second contrast intensity.

5. The method of claim 1, wherein said first layout pattern comprises at least one shape.

6. The method of claim 1, wherein said first layout pattern is selected from a group consisting of a contact hole pattern and a via hole pattern.

7. The method of claim 1, further comprising:
    verifying if said first group and said second group are both on target.

8. The method of claim 7, wherein a parameter is used to verify if said first group and said second group are both on target.

9. The method of claim 8, wherein said parameter comprises an exposure intensity.

10. The method of claim 1, wherein said second group amendment procedure determines a damping of said correction weight.

11. The method of claim 1, wherein said first group amendment procedure is performed on all said members of said first group.

12. The method of claim 1, wherein said first group amendment procedure is not performed on all said members of said second group.

13. The method of claim 1, wherein said second group amendment procedure is performed on all said members of said second group.

14. The method of claim 1, wherein verifying said amended first group and said amended second group till said amended first group and said amended second group are both on target further comprises:
    respectively performing said simulation procedure on all said members of said first group to obtain first group data;
    performing said first group amendment procedure on said amended first group according to said first group data to obtain said amended first group till all said members of said first group are on target;
    respectively performing said simulation procedure on all said members of said second group to obtain second group data; and
    performing said second group amendment procedure on said amended second group according to said second group data to obtain said amended second group till all said members of said second group are on target.

15. The method of claim 1, further comprising:
    performing an optical proximity correction on a preliminary layout pattern to obtain said first layout pattern.

16. The method of claim 1, further comprising:
    performing a priority selection procedure on said first group and on said second group to obtain a first group and a second group.

17. The method of claim 16, wherein said priority selection procedure is performed based on the sensitivity of an operational amendment.

18. The method of claim 16, wherein said first group is a sensitive group and said second group is an indifferent group.

19. A method to selectively amend a layout pattern, comprising:
    providing a first layout pattern comprising at least a first group and a second group, wherein each of said first group and said second group respectively comprises multiple members;
    performing a priority selection procedure on said first group and on said second group to obtain said first group and said second group, wherein said first group is a sensitive group and said second group is an indifferent group;
    respectively performing a simulation procedure and a first group amendment procedure on said members of said first group to obtain an amended first group;

respectively performing said simulation procedure and an second group amendment procedure on said members of said second group to obtain an amended second group;

verifying said amended first group and said amended second group till said amended first group and said amended second group are both on target; and outputting a second layout pattern comprising said amended first group and said amended second group which are both on target.

20. The method of claim 19, wherein said first group and said second group respectively is a first edge and a second edge of at least one geometric figure.

21. The method of claim 20, wherein said first edge is normal to said second edge.

22. The method of claim 19, wherein said first group and said second group respectively have a first contrast intensity and a second contrast intensity.

23. The method of claim 19, wherein said first layout pattern comprises at least one shape.

24. The method of claim 19, wherein said first layout pattern is selected from a group consisting of a contact hole pattern and a via hole pattern.

25. The method of claim 19, further comprising:
verifying if said first group and said second group are both on target.

26. The method of claim 25, wherein a parameter is used to verify if said first group and said second group are both on target.

27. The method of claim 26, wherein said parameter comprises an exposure intensity.

28. The method of claim 19, wherein said simulation procedure evaluates a correction direction and a correction weight.

29. The method of claim 28, wherein said first group amendment procedure determines a damping of said correction weight.

30. The method of claim 29, wherein said second group amendment procedure determines a damping of said correction weight.

31. The method of claim 19, wherein said first group amendment procedure is performed on all said members of said first group.

32. The method of claim 19, wherein said first group amendment procedure is not performed on all said members of said second group.

33. The method of claim 19, wherein said second group amendment procedure is performed on all said members of said second group.

34. The method of claim 19, wherein verifying said amended first group and said amended second group till said amended first group and said amended second group are both on target further comprises:
respectively performing said simulation procedure on all said members of said first group to obtain first group data;
performing said first group amendment procedure on said amended first group according to said first group data to obtain said amended first group till all said members of said first group are on target;
respectively performing said simulation procedure on all said members of said second group to obtain second group data; and
performing said second group amendment procedure on said amended second group according to said second group data to obtain said amended second group till all said members of said second group are on target.

35. The method of claim 19, further comprising:
performing an optical proximity correction on a preliminary layout pattern to obtain said first layout pattern.

36. The method of claim 19, wherein said priority selection procedure is performed based on the sensitivity of an operational amendment.

* * * * *